(12) United States Patent
Ueda et al.

(10) Patent No.: US 10,317,589 B2
(45) Date of Patent: Jun. 11, 2019

(54) OPTICAL LOW-PASS FILTER AND IMAGE PICKUP APPARATUS

(71) Applicant: CANON KABUSHIKI KAISHA, Tokyo (JP)

(72) Inventors: Kei Ueda, Utsunomiya (JP); Kazuhiko Momoki, Koshigaya (JP); Yutaka Yamaguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 15/145,147

(22) Filed: May 3, 2016

(65) Prior Publication Data

US 2016/0334555 A1 Nov. 17, 2016

(30) Foreign Application Priority Data

May 13, 2015 (JP) .................................. 2015-097860

(51) Int. Cl.
*G02B 5/20* (2006.01)
*G02B 5/30* (2006.01)
*G02B 27/46* (2006.01)

(52) U.S. Cl.
CPC .......... *G02B 5/203* (2013.01); *G02B 5/3083* (2013.01); *G02B 27/46* (2013.01)

(58) Field of Classification Search
CPC ....... G02B 5/203; G02B 5/3083; G02B 27/46
USPC ....................................................... 359/558
See application file for complete search history.

(56) References Cited

U.S. PATENT DOCUMENTS

| 4,998,800 A | 3/1991 | Nishida et al. |
| 5,467,224 A | 11/1995 | Ohnishi et al. |
| 8,199,231 B2 * | 6/2012 | Takamiya ............ G02B 5/1871 348/291 |
| 2007/0031140 A1 * | 2/2007 | Biernath .............. G02B 5/1833 396/268 |

FOREIGN PATENT DOCUMENTS

| JP | 1-254912 A | 10/1989 |
| JP | 3204471 B2 | 9/2001 |
| JP | 2008046163 A | 2/2008 |
| JP | 2008261925 A | 10/2008 |
| JP | 2010145614 A | 7/2010 |

OTHER PUBLICATIONS

Office Action issued in Japanese Appln. No. 2015-097860 dated Mar. 19, 2019. English translation provided.

* cited by examiner

*Primary Examiner* — Wen Huang
(74) *Attorney, Agent, or Firm* — Rossi, Kimms & McDowell LLP

(57) ABSTRACT

An optical low-pass filter is arranged on an object side than an image sensor in an image pickup apparatus and has an unevenness shape. The conditions of 5.0 μm≤Δz≤80.0 μm and 1.0≤Ps/<Pf>≤20.0 are satisfied where Δz represents a distance between the optical low-pass filter and the image sensor, Ps represents a pixel pitch of the image sensor, and <Pf> represents an average pitch of the unevenness shape.

3 Claims, 17 Drawing Sheets

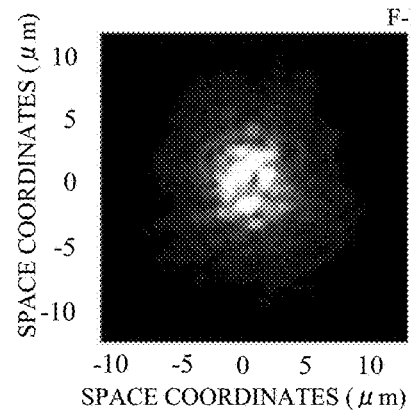 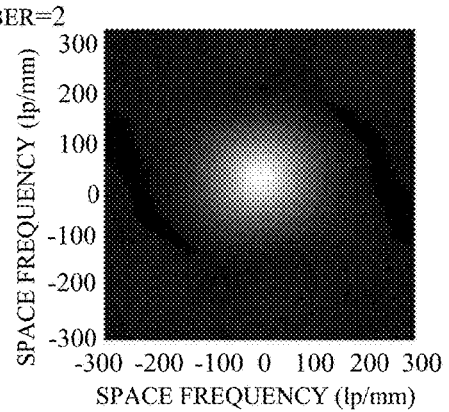
FIG. 3A  FIG. 3B
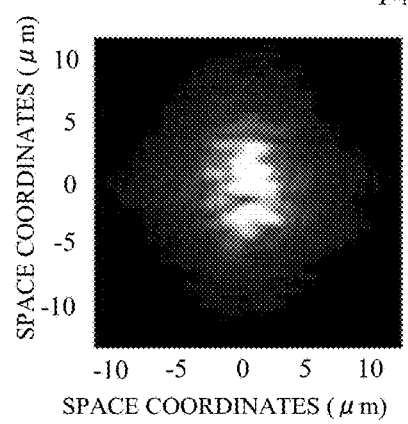 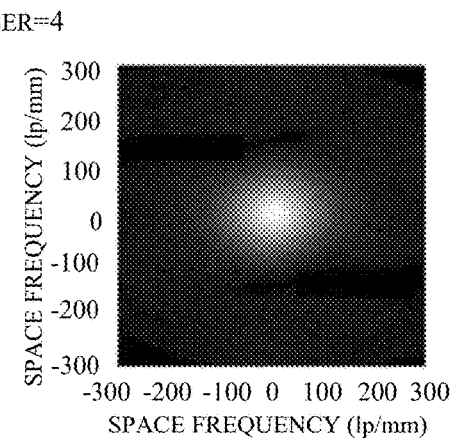
FIG. 3C  FIG. 3D
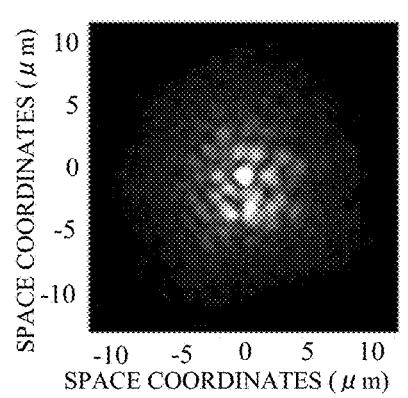 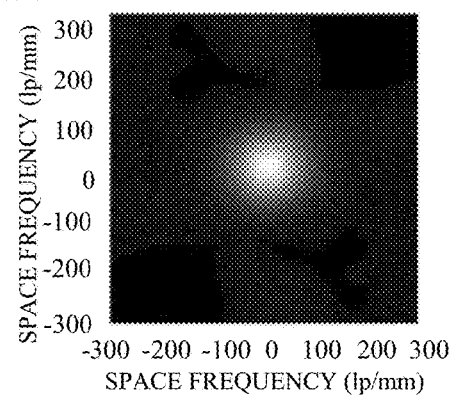
FIG. 3E  FIG. 3F

OPTICAL LOW-PASS FILTER AND IMAGE PICKUP APPARATUS

BACKGROUND OF THE INVENTION

Field of the Invention

The present invention relates an optical low-pass filter and an image pickup apparatus including the same.

Description of the Related Art

An image pickup apparatus such as a digital still camera and a video camera using a two-dimensional solid image pickup element (image sensor) such as a CCD and a C-MOS sensor uses an optical low-pass filter to prevent color moire and luminance moire of an image. Using the optical low-pass filter can control luminance distribution of a high frequency reaching the image sensor. Four-point separation optical low-pass filters consisted of a horizontal separation birefringent plate and a vertical separation birefringent plate have been most used commonly. The optical low-pass filter of Japanese Patent Laid-open No. 1-254912 and Japanese Patent No. 3204471 utilizes diffraction of an incident light generated by a micro refractive index distribution shape formed on a surface and controls a pitch of the micro refractive index distribution shape to obtain a desired point image distribution width.

However, when a light having a large F-number obliquely enters the optical low-pass filter of Japanese Patent Laid-open No. 1-254912 and Japanese Patent No. 3204471, there are fears that negative effects such as shadows and misregistrations due to edges of the refractive index distribution shape occur. This is because a diameter of the light having the large F-number is equivalent to a structure of the optical low-pass filter, and diffraction of the incident light generated by the refractive index distribution shape fails to occur.

Additionally, each of the commonly used four-point separation optical low-pass filters has a MTF shape different in horizontal and diagonal directions, and a MTF in the horizontal direction falls into 0 at a space frequency (trap point) corresponding to a separation width of four-point separation of 0.5 times. Then, if color moire in the diagonal direction is controlled, the separation width cannot be sufficiently widened and resolution in the horizontal direction falls compared with resolution in the diagonal direction.

Further, the four-point separation optical low-pass filters and the optical low-pass filter of Japanese Patent Laid-open No. 1-254912 and Japanese Patent No. 3204471 cannot prevent luminance moire of a low frequency generated at a space frequency that is approximately twice of the Nyquist frequency.

SUMMARY OF THE INVENTION

In view of the foregoing, the present invention provides an optical low-pass filter capable of controlling dependence on an F-number and maintaining resolution in a horizontal direction while suppressing color moire in a diagonal direction.

An optical low-pass filter as one aspect of the present invention is arranged on an object side than an image sensor in an image pickup apparatus and has an unevenness shape. The conditions of 5.0 $\mu m \leq \Delta z \leq 80.0$ $\mu m$ and $1.0 \leq Ps/<Pf> \leq 20.0$ are satisfied where $\Delta z$ represents a distance between the optical low-pass filter and the image sensor, Ps represents a pixel pitch of the image sensor, and $<Pf>$ represents an average pitch of the unevenness shape.

An image pickup apparatus as another aspect of the present invention includes an image sensor and the optical low-pass filter arranged on an object side of the image sensor.

Further features of the present invention will become apparent from the following description of exemplary embodiments with reference to the attached drawings.

BRIEF DESCRIPTION OF THE DRAWINGS

FIGS. 3A to 3F are explanatory views of dependence on an F-number of an optical low-pass filter.

DESCRIPTION OF THE PREFERRED EMBODIMENTS

Figure 1A:
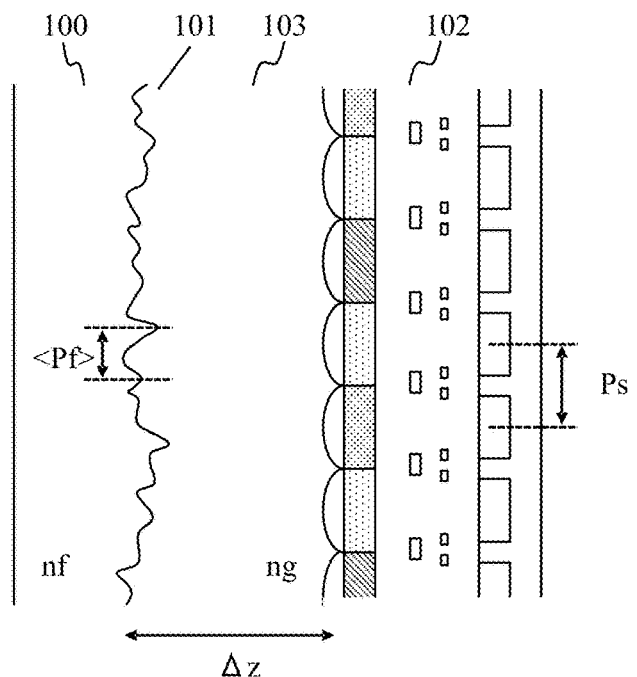
FIGS. 1A to 1C are explanatory views of an optical low-pass filter according to an embodiment of the present invention.

Exemplary embodiments of the present invention will be described below with reference to the accompanied drawings. In each of the drawings, the same elements will be denoted by the same reference numerals and the duplicate descriptions thereof will be omitted.

Figure 1B:
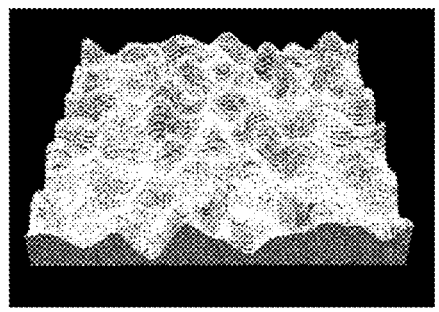
Figure 1C:
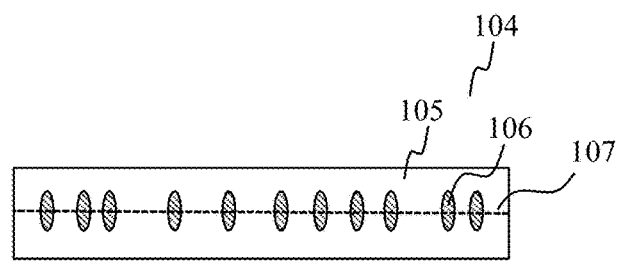

FIGS. 1A to 1C are explanatory views of an optical low-pass filter 100 according to an embodiment of the present invention. FIG. 1A is an arrangement plan of the optical low-pass filter 100, and FIG. 1B is a perspective view of the optical low-pass filter 100. The optical low-pass filter 100 includes a substrate 103 having visible light translucency of refractive index n1, and a micro unevenness refractive index interface 101, which has an unevenness shape of an average pitch <Pf>, is formed on a surface of the substrate 103. The optical low-pass filter 100 generates diffraction occurs by the micro unevenness refractive index interface 101 and superimposes optical low-pass effect widening distribution (emitted light flux distribution) of a light flux that is incident to the optical low-pass filter 100 as an incident light flux and passes through the optical low-pass filter 100. The optical low-pass filter 100 is arranged at a position away from a surface on an object side of an image sensor 102 by a distance $\Delta z$. The optical low-pass filter 100 according to this embodiment satisfies the following conditions so as to control dependence on an F-number and to maintain resolution in a horizontal direction while suppressing color moire in a diagonal direction. Ps represents a pixel pitch of the image sensor 102.

$$5.0 \ \mu m \leq \Delta z \leq 80.0 \ \mu m \tag{1}$$

$$1.0 \leq Ps/<Pf> \leq 20.0 \tag{2}$$

The optical low-pass filter 100 must have a structure including the micro unevenness refractive index interface 101. For example, when nf is a refractive index of the optical low-pass filter 100 and ng is a refractive index of an intermediate medium between the optical low-pass filter 100 and the image sensor 102, the optical low-pass filter 100 may have a refractive index configuration that the refractive index nf is 1.0 (atmosphere) and the refractive index ng is not 1.0 (medium). The optical low-pass filter 100 may also have a refractive index configuration that the refractive index nf is not 1.0 (medium) and the refractive index ng is not 1.0 (medium).

Moreover, the optical low-pass filter 100 may have two micro unevenness refractive index interfaces 101, and the distance $\Delta z$ is determined on the basis of a distance from a surface of the micro unevenness refractive index interface 101 having a small average pitch <Pf> to a surface of the image sensor 102.

Additionally, the micro unevenness refractive index interface 101 is not limited to a distribution shape, in which an interface by two mediums is formed, as illustrated in FIG. 1B. As illustrated in FIG. 1C, an optical low-pass filter 104 may also have a micro unevenness refractive index interface 107 formed in a base material 105, in which a medium 106 having a refractive index different from that of the base material 105 is implanted. The medium 106 having the refractive index different from that of the base material 105 may be a refractive index variation portion that varies a refractive index based on density of the same medium and change in composition.

Figure 2A:
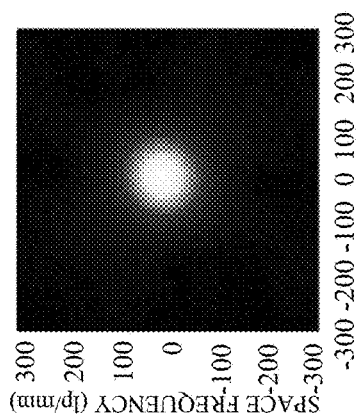
FIGS. 2A to 2D are explanatory views of characteristics of an optical low-pass filter.
Figure 2B:
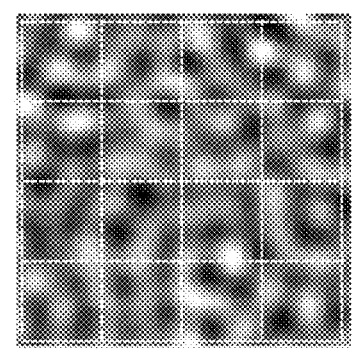
Figure 2C:
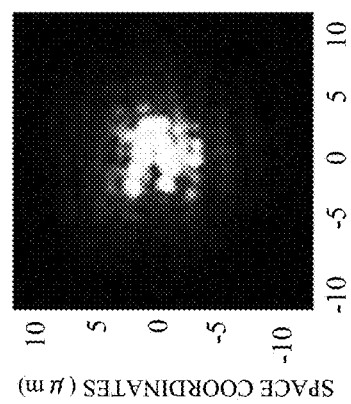
Figure 2D:
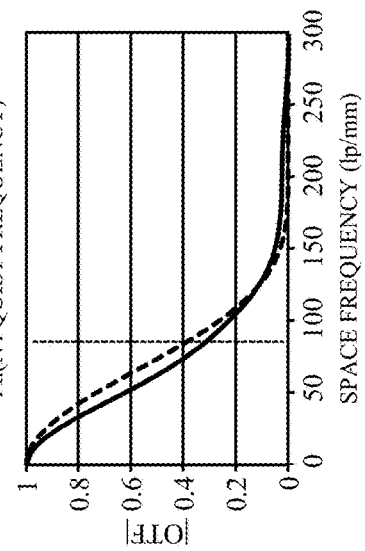

FIGS. 2A to 2D are explanatory views of characteristics of the optical low-pass filter 100. Table 1 shows parameters of the optical low-pass filter 100. Definitions of the average pitch <Pf> and a filter coefficient Pf are described below. When the F-number is especially not specified, the F number and a wavelength $\lambda$ of the incident light flux are respectively set to 4 and 550 nm. FIG. 2A illustrates a spot shape of an image pickup surface when the optical low-pass filter 100 is arranged at a position where the distance $\Delta z$ is 10 μm. FIG. 2B illustrates two-dimensional MTF distribution obtained by Fourier transformation of FIG. 2A. They are obtained using Finite Difference Time Domain (FDTD) simulation. FIG. 2C illustrates one-dimensional MTF characteristics when a value of an ordinate axis of FIG. 2B is 01 p/mm, an abscissa axis is a space frequency that is an abscissa axis of FIG. 2B, and an ordinate axis is a MTF. Hereinafter, an abscissa axis direction is referred to as "X direction" and an ordinate axis direction is referred to as "Y direction. FIG. 2D illustrates the micro unevenness refractive index interface 101, and one section separated by the broken lines represents a size of one pixel of the image sensor 102 in which the pixel pitch is 6.4 μm. The spot shape of FIG. 2A is obtained by averaging results of nine points calculated by moving a filter position by 1500 nm in both X and Y directions to obtain an average of light reached to each pixel. As illustrated in FIG. 2B, the optical low-pass filter 100 according to this embodiment can obtain frequency characteristics close to Gaussian distribution without depending on the horizontal and diagonal directions different from four-point separation optical low-pass filters. Moreover, in FIG. 2C, the Nyquist frequency Fn is illustrated when the pixel pitch Ps is 6.4 μm, but no trap point where the MTF intensity is 0 at a frequency band more than the Nyquist frequency Fn exists. In FIG. 2C, the characteristics of the optical low-pass filter 100 approximately coincide with ideal Gaussian distribution characteristics indicated by the broken line except for a high frequency region. These MTF characteristics can maintain high resolution sensitivity in the horizontal direction while suppressing color moire in the diagonal direction described below.

Figure 4A:
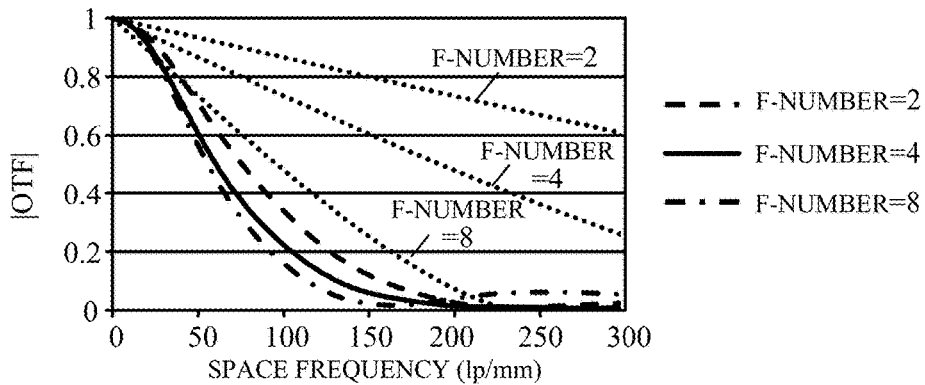
FIGS. 4A and 4B are one-dimensional MTF characteristics diagrams of each F-number of an optical low-pass filter.
Figure 4B:
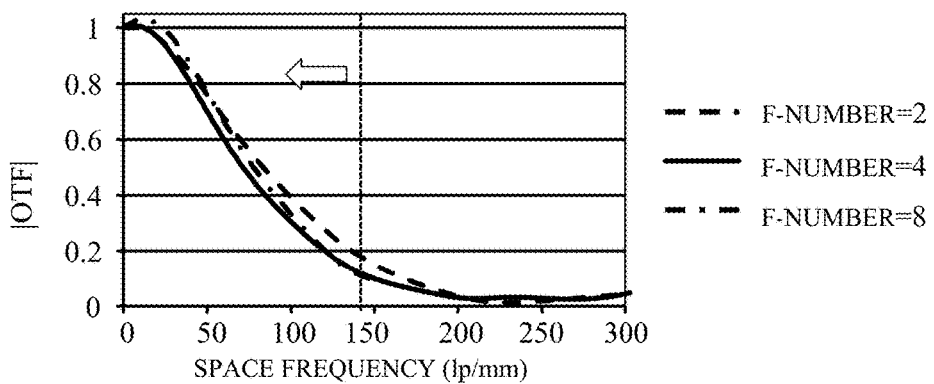

Next, dependence on the F number will be explained referring to FIGS. 3A to 3F. FIGS. 3A and 3B respectively illustrate a spot shape and two-dimensional MTF characteristics on the image pickup surface when the F-number is 2. FIGS. 3C and 3D respectively illustrate a spot shape and two-dimensional MTF characteristics on the image pickup surface when the F-number is 4. FIGS. 3E and 3F respectively illustrate a spot shape and two-dimensional MTF characteristics on the image pickup surface when the F-number is 8. The spot shapes of FIGS. 3A, 3C and 3E are obtained by averaging results of nine points calculated by moving the filter position by 1500 nm in both X and Y directions to obtain an average of light reached to each pixel. FIG. 4A illustrates MTF characteristics when the value in the Y direction is 01 p/mm in FIGS. 3B, 3D and 3F and MTF characteristics of each diffraction limit indicated by the dotted line. FIG. 4B illustrates MTF characteristics, which is calculated by normalizing the MTF obtained from the spot shape of the simulation by the diffraction-limited MTF, to correct reduction of the MTF due to the diffraction limit and evaluate the MTF derived from the optical low-pass filter 100. When the F-number is 8, MTF intensity at the space frequency of 1501 p/mm or more after transmitting through the optical low-pass filter 100 is approximately 0 and thus normalization of the MTF at the space frequency 1501 p/mm or more cannot be performed. Accordingly, when performing normalization of the MTF at the space frequency of 1501 p/mm or less, each MTF shape roughly coincides with one another. From the above, the optical low-pass filter 100 according to this embodiment has high robustness with respect to changes of the F-number.

Conditions to realize the optical low-pass filter 100 capable of controlling dependence on the F-number and maintaining high resolution sensitivity in the horizontal direction while suppressing color moire in the diagonal direction will be explained. The optical low-pass filter 100 is arranged proximate to the image sensor 102 and includes a distribution structure having the average pitch <Pf> smaller than the pixel pitch of the image sensor 102. The conventional optical low-pass filter utilizing diffraction by a refractive index distribution shape is arranged sufficiently apart from the image sensor, and generates shadows and misregistrations due to the refractive index distribution shape when the F-number is larger. This is because the larger F-number minifies the light flux at the position of the optical low-pass filter 100, fails to average structures to enter the light flux, and fails to generate diffraction by the average pitch. In view of this problem, the optical low-pass filter 100 is arranged proximate to the image sensor 102 in this embodiment to improve robustness relative to changes of the F-number. A condensed light having the large F-number reach the diffraction limit and does not become smaller than a constant light flux width when coming to a distance sufficiently close to a focal point. In this embodiment, utilizing characteristics of this diffraction optics and arranging the optical low-pass filter in a focal depth where the light flux having the large F-number reaches the diffraction limit improve robustness relative to changes of the F-number. Since the optical low-pass filter needs to superimpose the optical low-pass effect at a short distance according to proximate arrangement between the optical low-pass filter and the image sensor, the average pitch <Pf> needs to be sufficiently finer relative to the pitch Ps of the image sensor.

Figure 5:
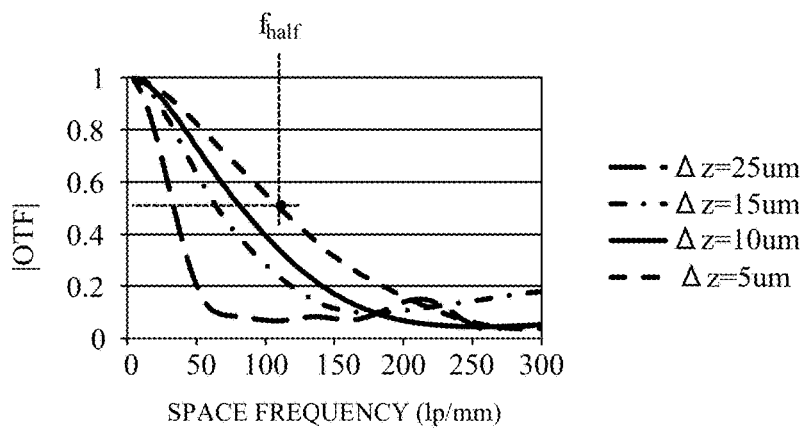
FIG. 5 is a one-dimensional MTF characteristics diagram at each filter position of an optical low-pass filter.
Figure 6:
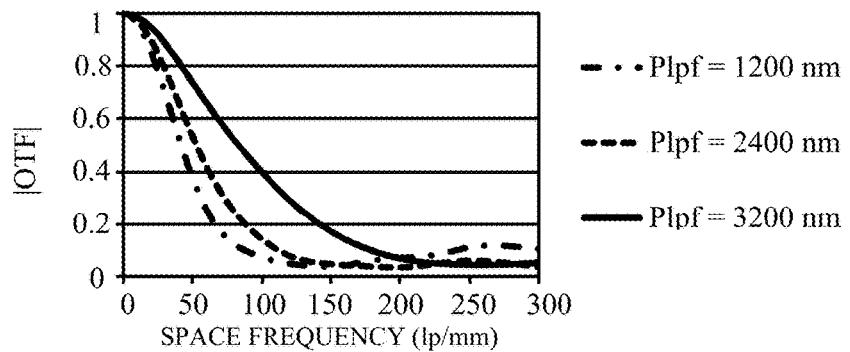
FIG. 6 is a one-dimensional MTF characteristics diagram at each filter coefficient of an optical low-pass filter.
Figure 7:
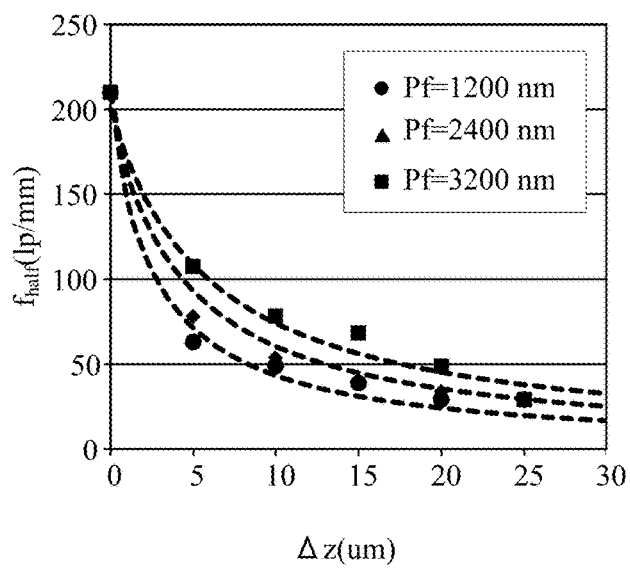
FIG. 7 is a schematic diagram of a MTF half-value width at a filter coefficient and a distance of an optical low-pass filter.

Next, relations among the distance $\Delta z$, the average pitch <Pf>, the refractive indexes n1 and n2, and the MTF will be explained. FIG. 5 illustrates one-dimensional characteristics when the distance $\Delta z$ changes. Simulation, where the F-number of the incident light flux is 4, the wavelength $\lambda$ is 550 nm, the filter coefficient Pf is 3200 nm, and the refractive indexes n1 and n2 respectively are 1.5 and 1.0, is performed. Extension of the image by diffraction is proportional to the distance $\Delta z$ and the smaller distance $\Delta z$ increases a space frequency fhalf of a half value width of the MTF. FIG. 6 illustrates one-dimensional MTF characteristics when the filter coefficient Pf changes. The distance $\Delta z$ is 10 μm and the refractive indexes n1 and n2 are respectively 1.5 and 1.0. Extension of the image by diffraction is inversely proportional to the filter coefficient Pf and the smaller filter coefficient Pf reduces the space frequency fhalf of the half value width of the MTF. FIG. 7 illustrates a result obtained by unifying the results of FIGS. 5 and 6 and plotting the space frequency fhalf of the half value width of the MTF when the distance $\Delta z$ and the filter coefficient Pf change. An ordinate axis represents the space frequency fhalf, an abscissa axis represents the distance $\Delta z$, a marker shape is different according to the filter coefficient Pf, and the broken lines represent model lines. A model curve becomes a reciprocal number of a linear function having an intercept in light of linearity of extension of distribution by propagation of a diffraction light relative to the distance $\Delta z$. The y intercept corresponds to the space frequency fhalf of the diffraction limit when the F-number is 4 without arranging the optical low-pass filter. The results roughly following the model curve are obtained under any condition.

Figure 8A:
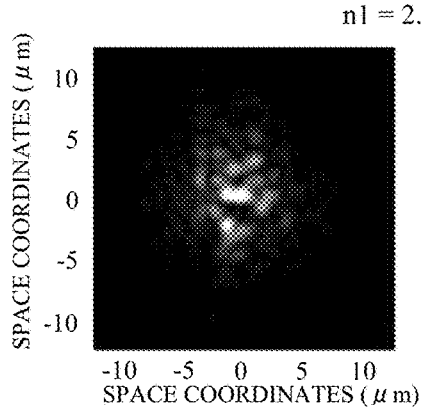
FIGS. 8A to 8F are schematic diagrams illustrating two-dimensional MTF characteristics and spot shapes at each refractive index of an optical low-pass filter.
Figure 8B:
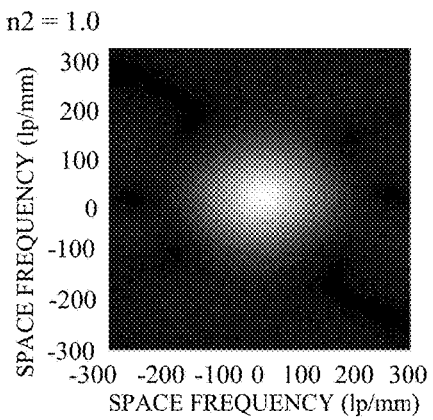
Figure 8C:
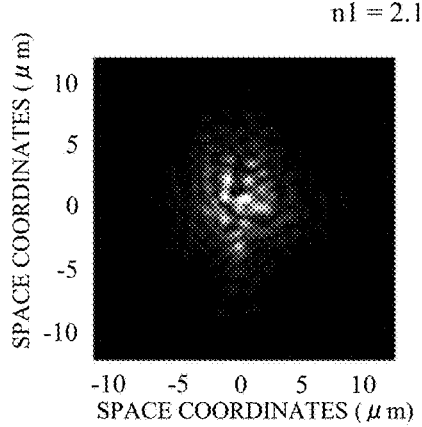
Figure 8D:
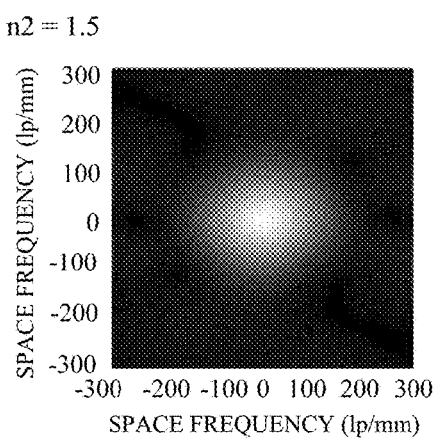
Figure 8E:
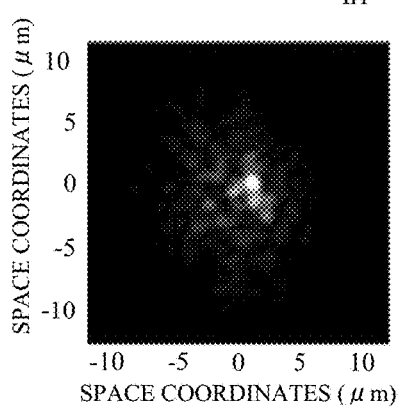
Figure 8F:
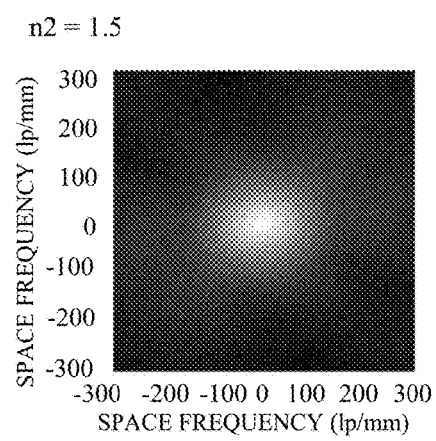
Figure 9:
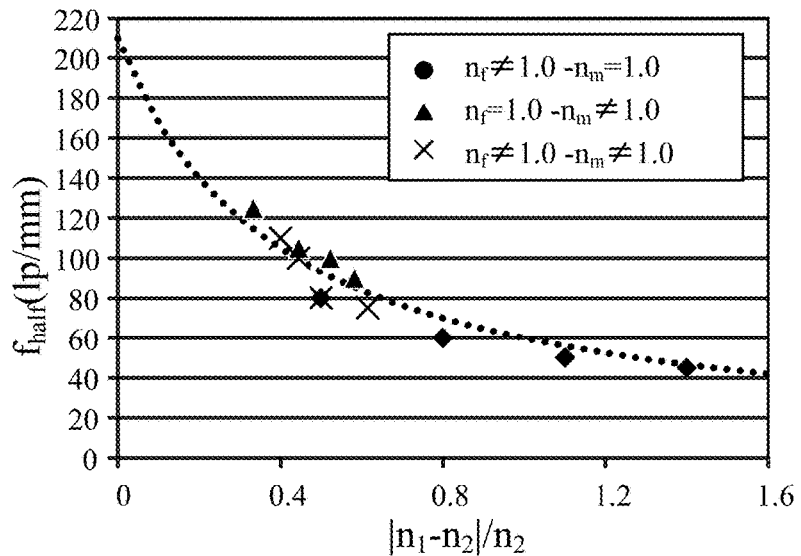
FIG. 9 is a schematic diagram illustrating MTF characteristics at each refractive index arrangement of an optical low-pass filter.

Next, obtaining the optical low-pass effect without reference to refractive index distribution will be explained. FIGS. 8A and 8B respectively illustrate a spot shape and two-dimensional MTF characteristics when the refractive indexes n1 and n2 are respectively 2.1 and 1.0. FIGS. 8C and 8D respectively illustrate a spot shape and two-dimensional MTF characteristics when the refractive indexes n1 and n2 are respectively 2.1 and 1.5. FIGS. 8E and 8F respectively illustrate a spot shape and two-dimensional MTF characteristics when the refractive indexes n1 and n2 are respectively 1.0 and 1.5. Simulation, where the F-number of the incident light flux is 4, the wavelength $\lambda$ is 550 nm, the average pitch <Pf> is 4000 nm, the filter coefficient Pf is 3200 nm, and the PV value of the refractive index distribution shape (a difference value between a maximum shape height and a minimum shape height of shape heights from a design surface of an optical low-pass filter in a refractive index distribution shape) d is 2400 nm, is performed. The optical low-pass effect is superimposed in any refractive index configuration. FIG. 9 illustrates the space frequency fhalf of each condition when an abscissa axis represents |n1−n2|/n2, and the broken line represents a model curve by a reciprocal number of a linear function having an intercept. The y intercept corresponds to the space frequency of the diffraction limit when the F-number is 4 without arranging the optical low-pass filter. The results of any refractive index configuration can be explained using the model curve. Effect of a refractive index term |n1−n2|/n2 is qualitatively explained by dividing the refractive index term |n1−n2|/n2 into a denominator and a numerator. The denominator is the refractive index n2 of the medium to the image sensor, and increasing the refractive index n2 decreases the diffraction angle and reduces the low-pass effect. Meanwhile, increasing the numerator |n1−n2| regarding phase differences raises diffraction efficiency and strengthens the optical low-pass effect. From the above, strength of the optical low-pass effect changes according to the refractive index term |n1−n2|/n2, but the optical low-pass effect can be superimposed in any refractive index configuration.

On the basis of these results, a range of the conditional expressions (1) and (2) will be explained. When a lower limit of the conditional expression (1) fails to be satisfied, a propagation distance after diffraction becomes too short to obtain the desired space frequency fhalf as illustrated in FIG. 7 and thus performance cannot be acquired. When an upper limit of the conditional expression (1) fails to be satisfied, robustness relative the F-number is lost as illustrated in FIGS. 3A to 3F and negative effects such as shadows and misregistrations may be generated by the large F-number. Moreover, when a lower limit of the conditional expression (2) fails to be satisfied, the micro refractive index distribution shape becomes too large relative to the light flux width, the diffraction by the random structure fails to be generated, the spatial frequency fhalf is deviated from the model curve of FIG. 7, and negative effects such as shadows and misregistrations may be generated. Meanwhile, when an upper limit of the conditional expression fails to be satisfied, the structure becomes too small relative to visible wavelength bands, the diffraction fails to be generated, and the space frequency fhalf is deviated from the model curve of FIG. 7. From the above, the range of the distance $\Delta z$ in the conditional expression (1) and the range of relations between the pixel pitch and the optical low-pass filter of the conditional expression (2) need to be satisfied so that the optical low-pass filter by the micro refractive index distribution shapes obtains performance controlling dependence on the F-number.

The average pitch <Pf> is an average pitch of the micro refractive index distribution shape of the optical low-pass filter and the conditional expressions (1) and (2) are also applied to a random structure where a regular period is not determined. In this embodiment, derivative values of ten cross-sectional shapes obtained by dividing a square region of 4·Ps×4·Ps in the micro unevenness refractive index interface into five equal parts in each side direction are used for a definition of the average pitch <Pf>. A point where positive and negative values of the derivative value of the cross-sectional shape are reversed corresponds to a peak or a trough of the micro refractive index distribution shape. When numbers of points, where peaks and troughs of the derivate values of the ten cross-sectional shapes are reversed, are number N, an average pitch of a length 4·Ps relative to one cross-sectional surface is calculated by an expression 8·PS/N. Sampling of shapes is performed by sectioning by a mesh of a pitch of 250 nm so that an inversion of positive and negative values of the derivate values by a structure having a wavelength smaller than a visible range wavelength is not included. In FIG. 2D, the square region of 4·Ps×4·Ps is illustrated by a mask of the broken line and the average pitch of the square region calculated by counting derivate values of cross-sectional shapes on the mask of the broken line is 3800 nm. Since one evaluation reflects a local structure, the average pitch <Pf> is finally determined by further averaging the average pitch of the square region randomly selected multiple times. In this embodiment, an evaluation is performed using five-times average results. In this embodiment, since a shape obtained by a filtering of a sinc function includes a low frequency shape, the average pitch <Pf> fails to coincide with the filter coefficient Pf.

Subsequently, a range of a PV value of the refractive index distribution shape (a difference value between a maximum shape height and a minimum shape height of shape heights from a design surface of an optical low-pass filter in a refractive index distribution shape) shape will be explained. When d represents the PV value of the refractive index distribution shape, an optical distance (n1−n2)·d desirably satisfies the following relational expression.

$$200 \text{ nm} \leq |(n1-n2) \cdot d| \leq 8000 \text{ nm} \quad (3)$$

In the structure implanted the mediums having different refractive indexes as illustrated in FIG. 1C, the PV value d of the refractive index distribution shape is determined according to the highest height of the structure. When the optical distance is smaller than a lower limit of the conditional expression (3), diffraction relative to a visible light fails to be generated and a desirable distribution shape cannot be obtained on the image pickup surface. Additionally, when the optical distance is larger than an upper limit of the conditional expression (3), an aspect ratio of the structure becomes too large and manufacturing the structure is hard.

The micro refractive index distribution shape preferably satisfies the conditional expressions (1) and (3), and more preferably be the random structure having no periodicity. In a periodic structure, folding derived from periodicity is generated in high frequency of the MTF, and low frequency luminance moire occurs when a high frequency signal is input. Moreover, when the structure has periodic distribution such as the four-point separation, the MTF changes according to a direction and horizontal direction resolution needs to be reduced to suppress color moire. Meanwhile, when the structure has equivalent spherically symmetrical MTF shapes along the diagonal direction of the four-point separation, MTF intensity become larger at near folding frequency in the horizontal direction of the four-point separation. From the above, the MTF shape is preferably a Gaussian shape to make the micro refractive index distribution shape a random structure having no specific periodicity. On the basis of diffraction derived from the random micro shape having no periodicity, an envelope function of the spot shape on the image pickup surface comes close to the Gaussian shape and the MTF shape also come close to the Gaussian shape.

Figure 10:
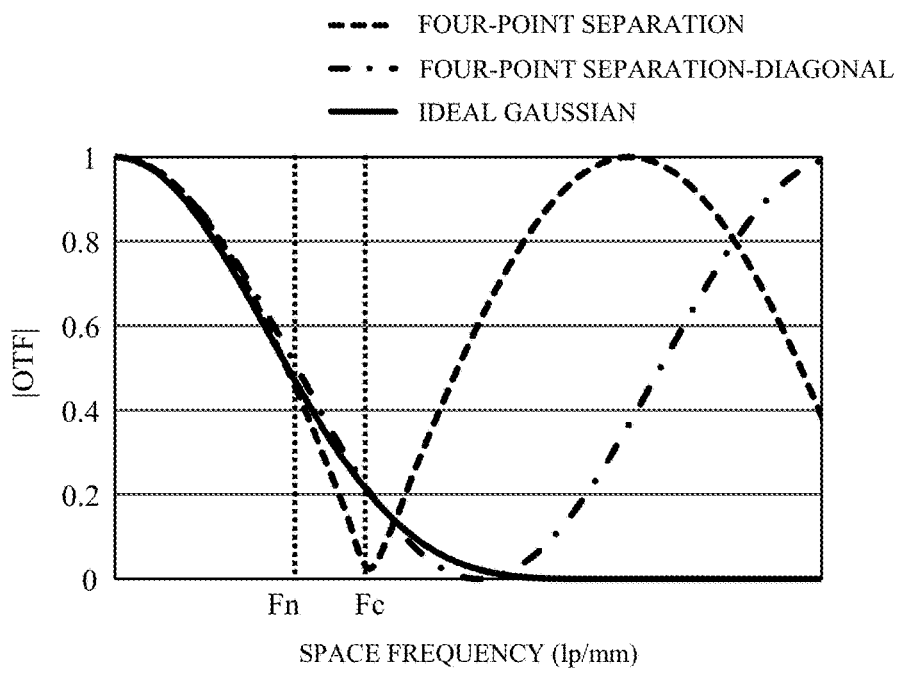
FIG. 10 is a schematic diagram of one-dimensional MTF characteristics of an optical low-pass filter of four-point separation distribution and Gaussian distribution.
Figure 11A:
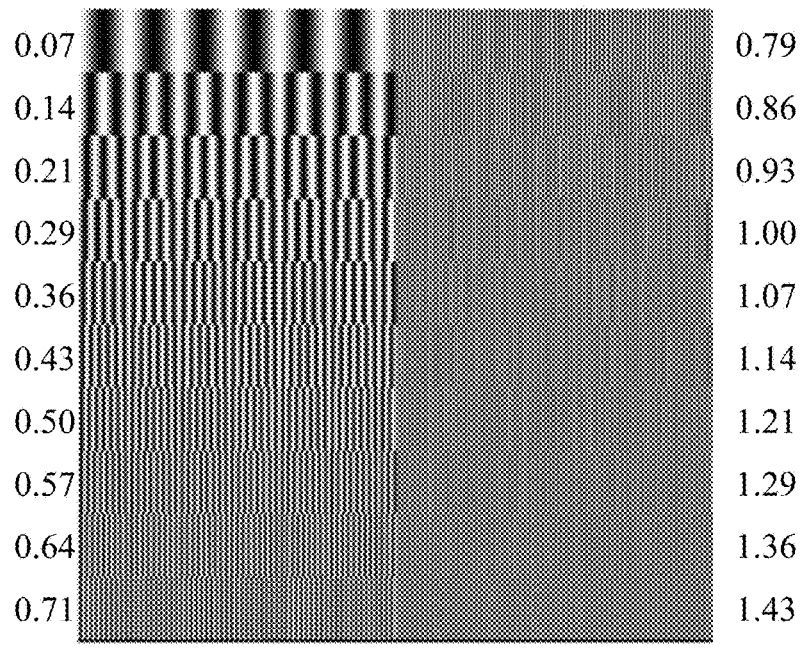
FIGS. 11A and 11B are a horizontal frequency chart and a diagonal frequency chart for characterization.
Figure 11B:
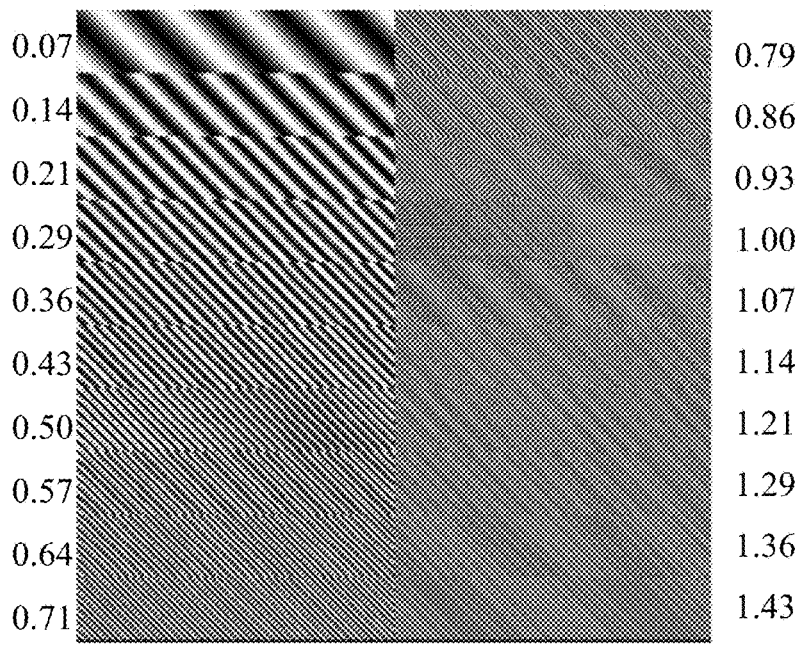

Next, an explanation that the MTF having the Gaussian shape has a desirable performance compared with the conventional four-point separation MTF will be provided using a response relative to a frequency signal. FIG. 10 illustrates the MTF of the ideal Gaussian distribution shape and the MTF of the conventional four-point separation in the horizontal direction and the diagonal direction. Relation between the space frequencies Fc and Fn is illustrated in FIG. 10 and the half value width of the Gaussian distribution is determined to be equivalent to the MTF half value width in the diagonal direction of the four-point separation. In this relation, the MTF intensity near the space frequency Fc in the horizontal direction of the four-point separation falls much below compared with that of Gaussian characteristics. FIG. 11A illustrates a horizontal frequency chart where a sin function vibrating in the horizontal direction is arranged at every frequencies of a constant multiple of the space frequency Fc and FIG. 11B illustrates a diagonal frequency chart where a sin function vibrating in the diagonal direction is arranged at every frequencies of a constant multiple of the space frequency Fc.

Figure 12A:
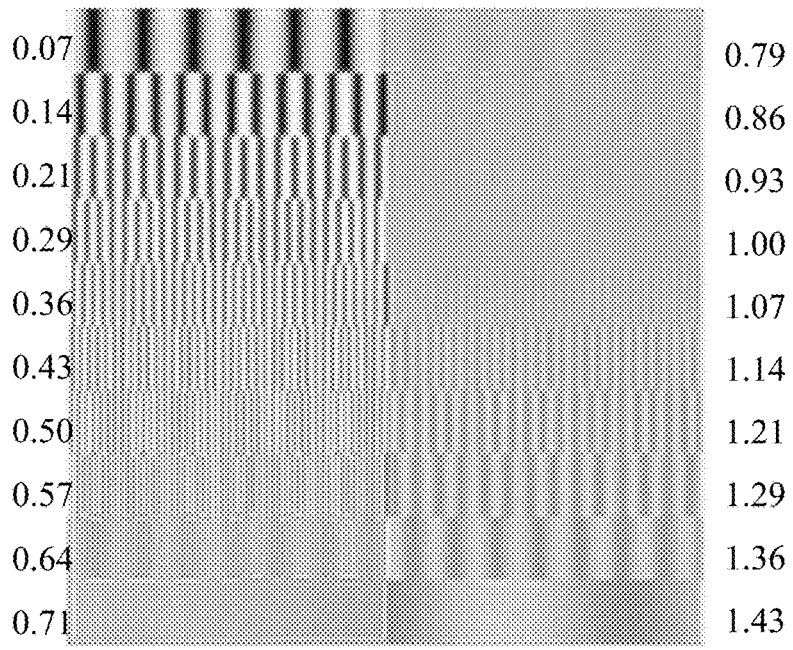
FIGS. 12A and 12B are horizontal frequency charts on which a MTF of four-point separation distribution or a MTF of ideal Gaussian distribution is superimposed.
Figure 12B:
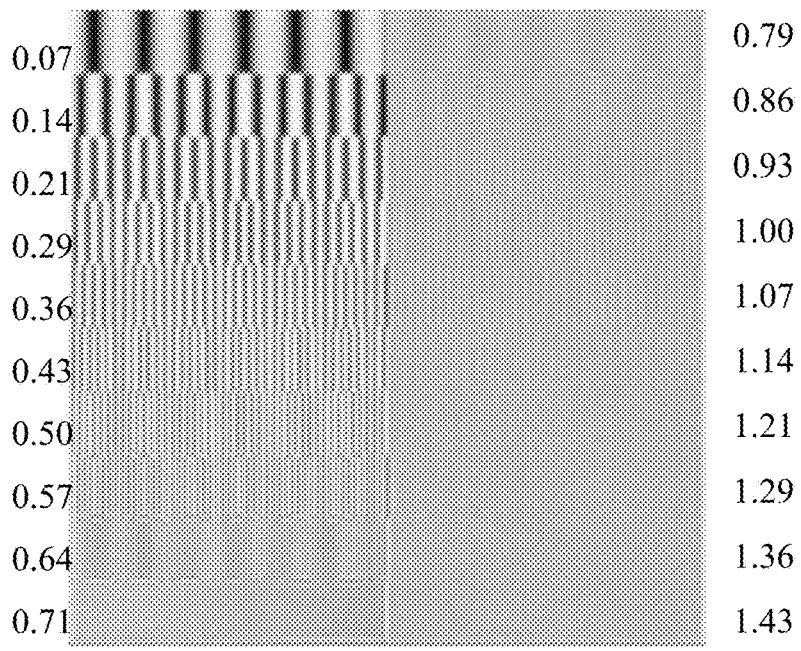

Images obtained by superposing the ideal Gaussian distribution and the four-point separation distribution on these charts are illustrated in FIGS. 12A and 12B and FIGS. 13A to 13D. The horizontal chart image of the four-point separation as illustrated in FIG. 12A fails to be resolved at the critical point Fc. Meanwhile, the horizontal chart image of the ideal Gaussian distribution in FIG. 12B is spuriously resolved at the critical point Fc. A frequency signal more than the Nyquist frequency is not resolved and is a spurious frequency signal where frequency is folded but high resolution sensitivity can be obtained even if the real frequency differs because the folded frequency is sufficiently high when differences between the space frequencies Fc and Fn are not large. From the above, the MTF shape having the Gaussian distribution is desirable in the light of resolution in the horizontal direction. Hereinafter, a frequency range which have small differences from the space frequency fn from 1.0·Fn to 1.5·Fn is referred to as "high frequency spuriously resolution range".

The signal of 1.43·Fc in the horizontal chart image of the four-point separation distribution of FIG. 12A is spuriously resolved as low frequency luminance moire greatly deviated from the real frequency because the MTF intensity is sufficiently high. The signal of 1.43·Fc in the horizontal chart image of the Gaussian distribution in FIG. 12B is not resolved because the MTF intensity is approximately 0. Since a spurious resolution signal greatly deviates from the real frequency at a frequency near 1.43·Fc and becomes low frequency luminance moire, high MTF intensity is not desirable. Accordingly, the Gaussian distribution shape is advantageous in the light of presence or absence of resolution of low frequency luminance moire.

Figure 13A:
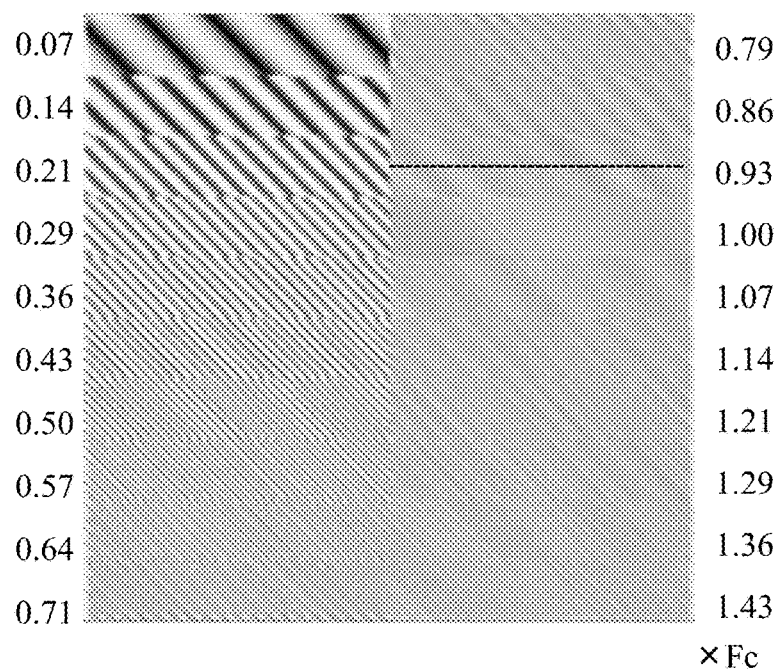
FIGS. 13A to 13D are diagonal frequency charts on which a MTF of four-point separation distribution or a MTF of ideal Gaussian distribution is superimposed.
Figure 13B:
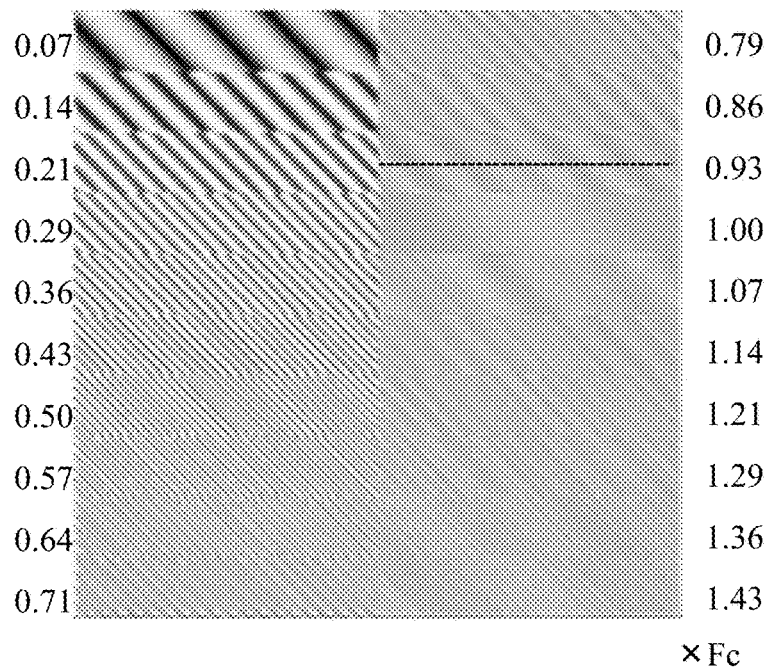
Figure 13C:
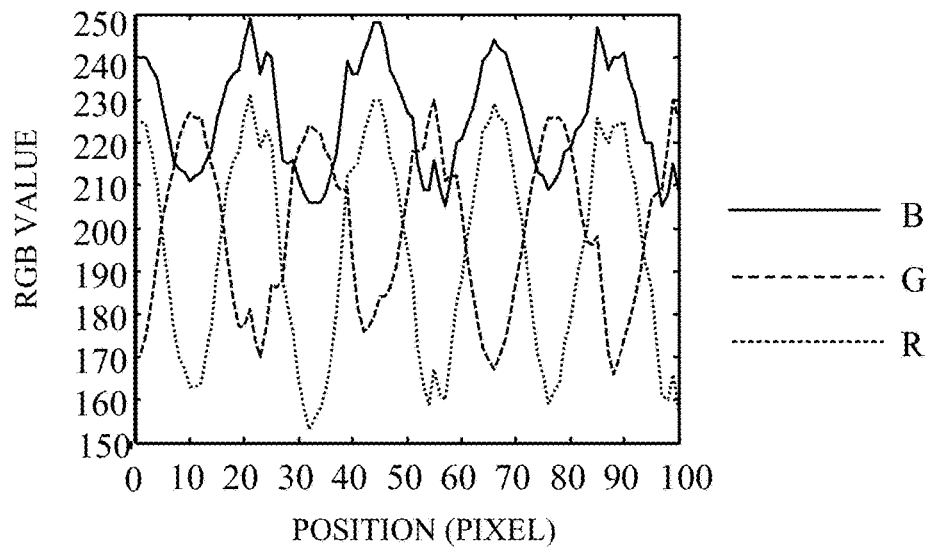
Figure 13D:
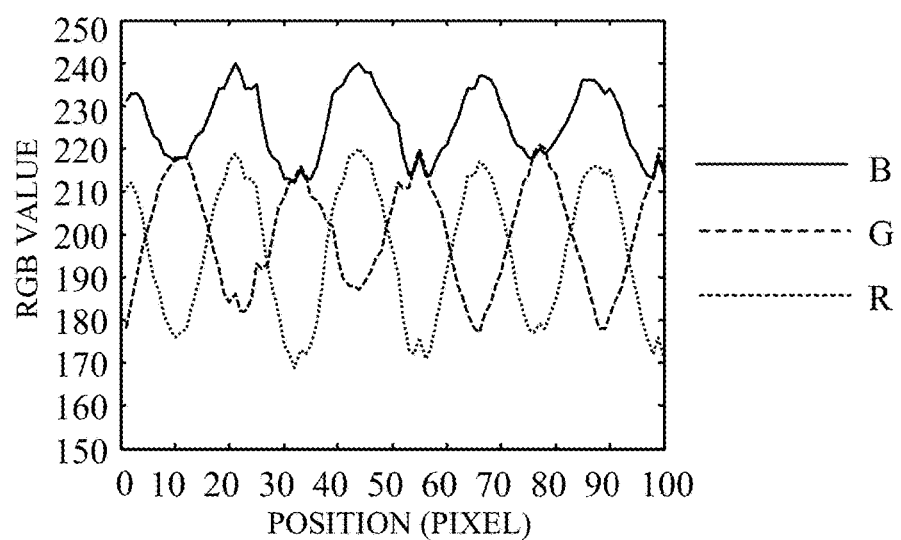

FIGS. 13A and 13B are respectively output diagonal chart images by the four-point separation and the Gaussian distribution, and FIGS. 13C and 13D are respectively cross-sectional RGB values at a frequency of 0.93·Fc indicated by the broken lines in FIGS. 13A and 13B. Vibration phases of the RB channels invert relative to vibration phases of the G channel indicated by the broken lines in FIGS. 13C and 13D and color moire is generated. Color moire is generated with respect to input of a diagonal frequency signal being a frequency more than 0.79·Fc. Generations of color moire of the four-point separation or the Gaussian distribution are approximately equal from comparison between the chart images in FIGS. 13A and 13B. This result can be explained because the MTF shapes of FIGS. 11A and 11B are nearly equivalent.

Figure 14A:
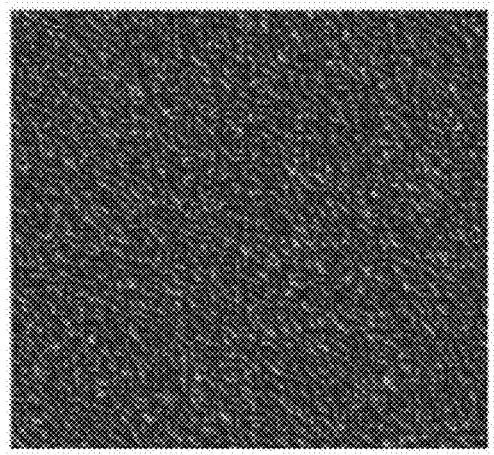
FIGS. 14A to 14D are schematic diagrams illustrating random structure based on uniform random numbers, a frequency filtered random structure, and frequency characteristics of them.
Figure 14B:
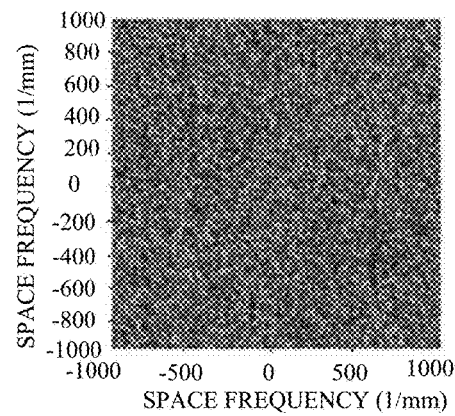
Figure 14C:
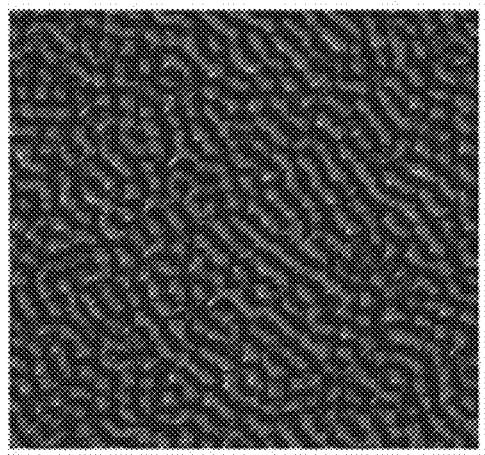
Figure 14D:
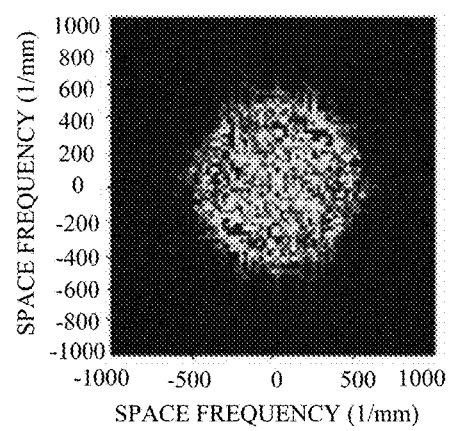
Figure 15:
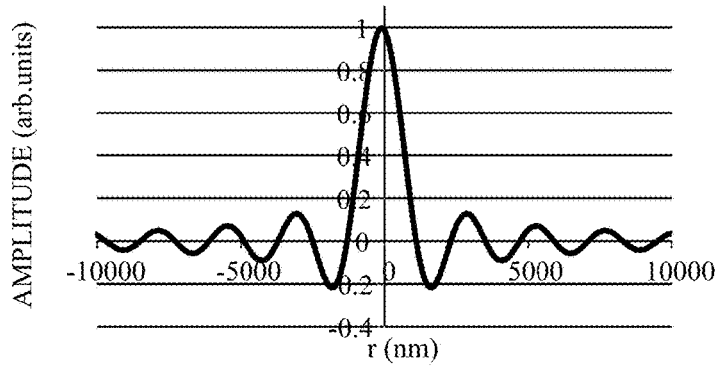
FIG. 15 is a schematic diagram illustrating a real space shape of a sinc function used for a frequency filtering.

From the above result, since resolution in the diagonal direction is the same and resolution in the horizontal direction exceeds the four-point separation, the MTF shapes of the Gaussian distribution are desirable. In this embodiment, a random shape obtained by performing a frequency filtering using convolution relative to uniform random numbers is applied to the micro unevenness refractive index interface 101. FIGS. 14A and 14B illustrate two-dimensional uniform random numbers distribution generated by a calculator and structure frequency characteristics obtained by performing Fourier transformation of the two-dimensional uniform random numbers distribution. FIGS. 14C and 14D illustrate random refractive index distribution shapes that is obtained by convoluting uniform random distribution using the following condition and is illustrated in FIG. 15 and structure frequency characteristics obtained by performing Fourier transformation of the random refractive index distribution shapes. r represents a distance from an origin. A sinc function and the filter coefficient Pf respectively correspond to a rectangle window and a cut-off frequency on a frequency space.

$$f(f)=\sin(\pi r/Pf)/(\pi r/Pf) \qquad (4)$$

Convoluting using the sinc function changes the structure frequency characteristics of FIG. 14B which are uniformly white colors into the structure frequency characteristics of FIG. 14D where components having a frequency more than the cut-off frequency are cut. The above filtering operation designs a structure where a pitch of a band is randomly controlled, generates diffraction derived from the average pitch <Pf>, and obtains the Gaussian distribution shape on the real space. The average pitch <Pf> obtained by the derivative value of the cross-sectional shape and the filter coefficient Pf of the sinc function used for the filtering are shown as parameters in each example.

Moreover, an autocorrelation function is used as an index of evaluation of randomness. When the highest peak intensity and the second highest peak intensity of autocorrelation of a shape height from a design surface of an optical low-pass filter in an arbitrary square region of 4·Ps×4·Ps in the micro unevenness refractive index interface are I0 and I1, and a distance from the second highest peak to the origin is Δr, satisfying the following conditional expression in any point of the interface is desirable.

$$0.05 \leq I1/I0 \leq 1-2.5(\Delta r/(2\times 4\cdot Ps)) \qquad (5)$$

Figure 16B:
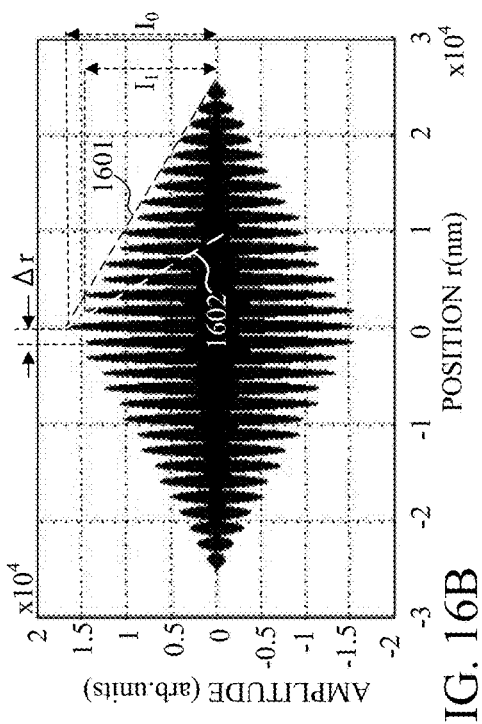
FIGS. 16A to 16D are schematic diagrams illustrating periodic structure periodic structure based on a sinc function, a frequency filtered random structure, and a autocorrelation function shape of them.
Figure 16D:
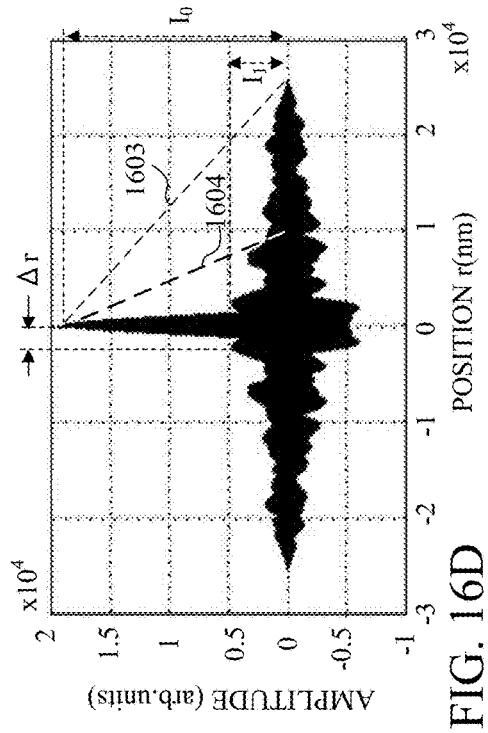
Figure 16A:
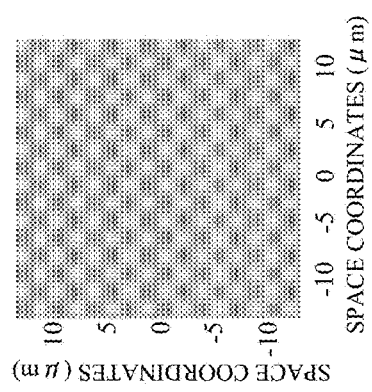

FIG. 16A illustrates an overhead view of the square region of 4·Ps×4·Ps of the structure that is a complete periodic structure in two-dimensional directions and is expressed by the following conditional expression. P0 is 3200 nm.

$$I(x,y)=\sin(2\pi x/P0)\cdot\sin(2\pi y/P0) \qquad (6)$$

FIG. 16B illustrates a view plotting shapes obtained by projecting the autocorrelation in the two-dimensional space of the structure illustrated in FIG. 16A in the one-dimensional direction. The pixel pitch Ps is 6400 nm. Since the structure of FIG. 16A is the complete periodic structure, a periodic peak derived from the structure periodicity is shown in FIG. 16A. This peak intensity decreases at greater distances from the origin and decreases according to an envelope curve 1601 expressed by the following condition when the structure is the complete periodic structure.

$$Ie0(r)=1-(r/(2\times 4\cdot Ps)) \qquad (7)$$

The dotted line of FIG. 16B is a straight line expressed by the conditional expression (7). The autocorrelation of the structure of FIG. 16A follows the envelope curve 1601 of the conditional expression (7). Accordingly, when Δr is a distance between the peak of the origin and the origin of the second highest intensity, the following conditional expression is satisfied in the complete periodic structure.

$$I1/I0=1-1.0(\Delta r/2\times 4\cdot Ps) \qquad (8)$$

The white broken line of FIG. 16B is a straight line 1602 expressed by the following conditional expression and the value of the straight line expressed by the following conditional expression at a peak position of the second highest peak intensity corresponds to the right side of the conditional expression (5).

$$Ie1(r)=1-2.5(r/2\times 4\cdot Ps) \qquad (9)$$

Figure 16C:
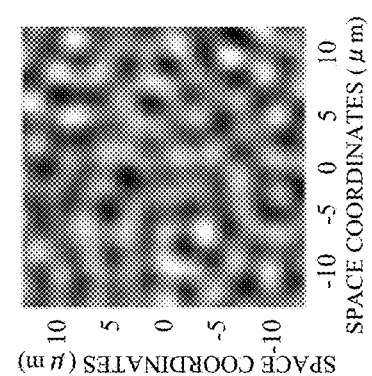

Accordingly, the structure illustrated in FIG. 16A fails to satisfy the conditional expression (5). FIG. 16C illustrates an overhead view of the square region of 4·Ps×4·Ps of the structure treated with a periodical filtering using the sinc function where the filter coefficient is 3200 nm. FIG. 16D illustrates a view plotting shapes obtained by projecting the autocorrelation function in the two-dimensional space of the structure illustrated in FIG. 16C in the Y direction. The broken line 1603 in FIG. 16D is expressed by the conditional expression (7) and in the random structure, the periodic peak derived from the pitch illustrated in FIG. 16B is not existed and the conditional expression (8) is not completed. Meanwhile, the broken line 1604 of FIG. 16D is a straight line expressed by the conditional expression (9), and since the autocorrelation shape falls below the broken line 1604, the structure illustrated in FIG. 16C satisfies the conditional expression (5). When the right side of the conditional expression (5) fails to be satisfied, randomness is not sufficient and MTF characteristics fails to be the Gaussian shape. Meanwhile, when the left side of the condition (5) is not satisfied, randomness is too large and extension derived from the average pitch <Pf> cannot be obtained.

The optical low-pass filter having a performance that maintains resolution in the horizontal direction while suppressing color moire in the diagonal direction is desirable but parameters superimposing strong optical low-pass filter effect may be used when color moire or luminance moire is strongly controlled according to a purpose. Then the optical low-pass filter having a desirable performance can be obtained by adjusting only structure parameters such as the distance Δz and the average pitch <Pf>.

First Example

An optical low-pass filter 100A according to this example has a performance maintaining MTF intensity in a horizontal direction in a high frequency spurious resolution region while suppressing color moire in a diagonal direction. Table 1 shows parameters of the optical low-pass filter 100A. The average pitch <Pf> is 3200 nm and the distance Δz is 10 μm. From values of the table 1, the conditional expression (1) regarding the distance Δz and the conditional expressions (2)

and (3) are satisfied. Performing the frequency filtering of the sinc function where the filter coefficient Pf is 3200 nm relative to uniform random numbers obtains the micro unevenness refractive index interface 101A of the optical low-pass filter 100A. FIG. 2A illustrates the spot shape of the image pickup surface when the optical low-pass filter 100A according to this example is arranged, FIG. 2B illustrates the two-dimensional MTF distribution obtained by Fourier transformation of FIG. 2A, and FIG. 2C illustrates the one-dimensional MTF characteristics of the cross-section in the X direction passing the origin in FIG. 2B. Simulation is performed using the wavelength λ as 550 nm, and the spot shape of FIG. 2A is obtained by averaging results of nine points calculated by moving a filter position by 1500 nm in both X and Y directions to obtain an average of light reached to each pixel. In FIG. 2C, the characteristics of the optical low-pass filter 100A approximately coincide with the ideal Gaussian distribution characteristics indicated by the broken line except for a high frequency region in this example. Shapes obtained by projecting the autocorrelation function of the two-dimensional space of the structure according to this example in the one-dimensional direction are illustrated in FIG. 16D, and satisfies the conditional expression (5).

Figure 17A:
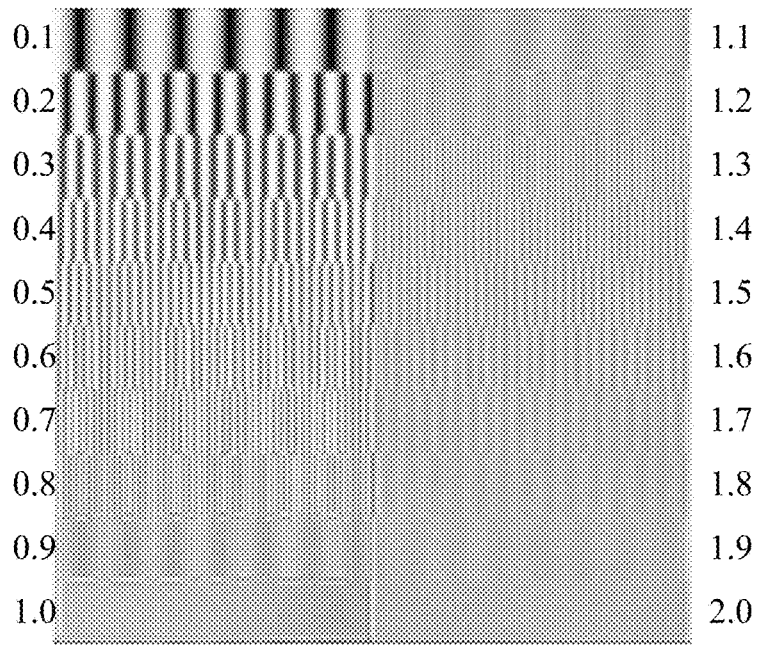
FIGS. 17A and 17B are a horizontal frequency chart and a diagonal frequency chart in which MTF characteristics according to a first embodiment are convoluted.
Figure 17B:
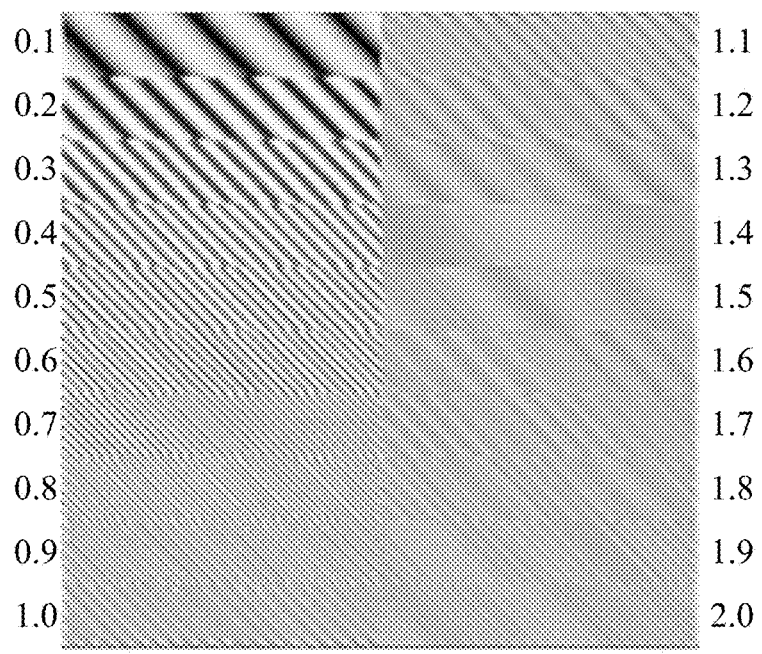

FIGS. 17A and 17B illustrates respectively output chart images obtained by superimposing the MTF of the optical low-pass filter on the charts of FIGS. 11A and 11B. Each frequency is expressed by constant multiplication of Nyquist frequency Fn with every 0.1. The images of FIGS. 17A and 17B has little difference compared with the images of FIGS. 12B and 13B obtained by superimposing the ideal Gaussian distribution, and maintains resolution in the horizontal direction while suppressing color moire in the diagonal direction.

From the above, using the optical low-pass filter according to this example can perform photographing superimposing the optical low-pass effect capable of controlling dependence on the F-number and maintaining high resolution sensitivity in the horizontal direction while suppressing color moire in the diagonal direction.

Second Example

Figure 18B:
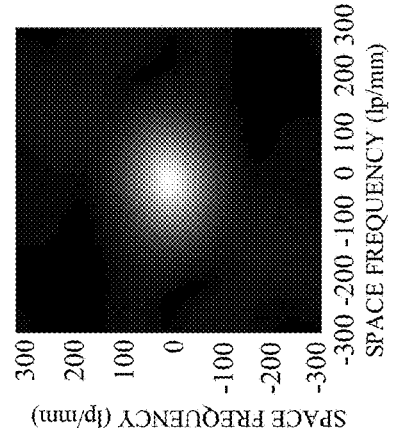
FIGS. 18A to 18D are a spot shape, two-dimensional MTF characteristics, one-dimensional MTF characteristics, and a autocorrelation shape according to a second embodiment.
Figure 18A:
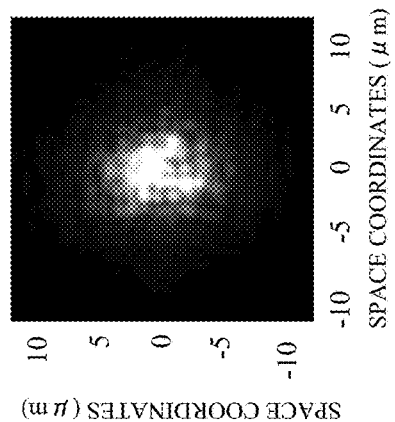
Figure 18D:
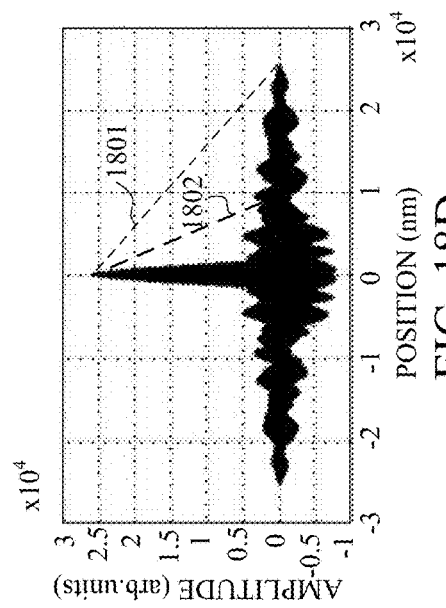
Figure 18C:
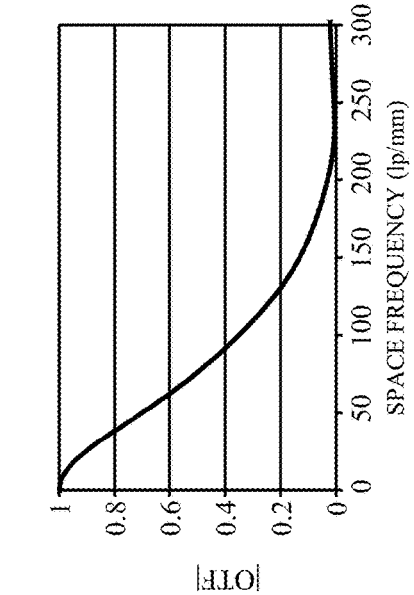

An optical low-pass filter 100B according to this example has a performance maintaining MTF intensity in a horizontal direction in a high frequency spurious resolution region while suppressing color moire in a diagonal direction. However, a refractive index arrangement is different from the first example, and the refractive indexes n1 and n2 are respectively 1.0 and 1.5. Table 2 shows parameters of the optical low-pass filter 100. The average pitch <Pf> is 3400 nm and the distance Δz is 10 μm. From the values of table 2, the conditional expression (1) regarding the distance Δz and the conditional expressions (2) and (3) are satisfied. Performing the frequency filtering of the sinc function where the filter coefficient Pf is 2800 nm relative to uniform random numbers obtains the micro unevenness refractive index interface 101B of the optical low-pass filter 100B. FIG. 18A illustrates a spot shape at the image pickup surface when the optical low-pass filter 100B is arranged. FIG. 18B illustrates two-dimensional MTF distribution obtained by Fourier transformation of FIG. 18A. FIG. 18C illustrates one-dimensional MTF characteristics of the cross-section in the X direction passing the origin in FIG. 18B. Simulation is performed using the wavelength λ as 550 nm, and the spot shape of FIG. 18A is obtained by averaging results of nine points calculated by moving a filter position by 1500 nm in both X and Y directions to obtain an average of light reached to each pixel. In FIG. 18C, the characteristics of the optical low-pass filter 100B approximately coincide with the ideal Gaussian distribution characteristics indicated by the broken line except for a high frequency region in this example. FIG. 18D illustrates shapes obtained by projecting an autocorrelation function of the two-dimensional space of the structure in the one-dimensional direction. A straight line 1801 is an envelope curve that is expressed by the conditional expression (5) and follows when the structure is a complete regular shape, and a straight line 1802 is a straight line expressed by the conditional expression (9). Since the second highest intensity peak falls below the conditional expression (9), the conditional expression (5) is satisfied.

From the above, using the optical low-pass filter according to this example can perform photographing superimposing the optical low-pass effect capable of maintaining high resolution sensitivity in the horizontal while suppressing color moire in the diagonal direction.

Third Example

Figure 19B:
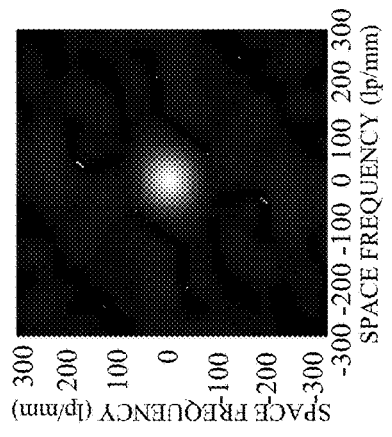
FIGS. 19A to 19D are a spot shape, two-dimensional MTF characteristics, one-dimensional MTF characteristics, and a autocorrelation shape according to a third embodiment.
Figure 19A:
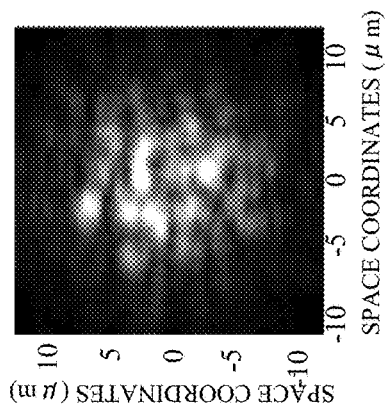
Figure 19D:
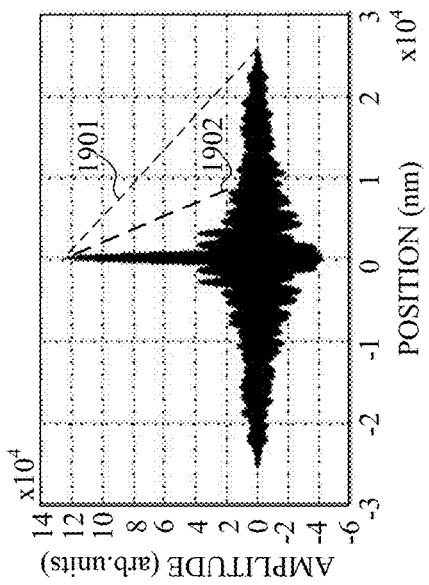
Figure 19C:
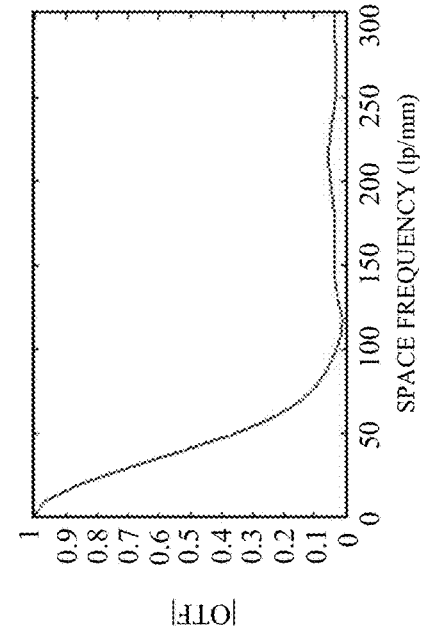

An optical low-pass filter 100C according to this example has a performance strongly suppressing color moire in a diagonal direction and low frequency luminance moire in a horizontal direction. Table 3 shows parameters of the optical low-pass filter 100C. From the values of table 3, the conditional expression (1) regarding the distance Δz and the conditional expressions (2) and (3) are satisfied. The average pitch <Pf> is 3000 nm and the distance Δz is 15 μm. Performing the frequency filtering of the sinc function where the filter coefficient Pf is 2400 nm relative to uniform random numbers obtains the micro unevenness refractive index interface 101C of the optical low-pass filter 100C. FIG. 19A illustrates a spot shape at the image pickup surface when the optical low-pass filter 100C is arranged. FIG. 19B illustrates two-dimensional MTF distribution obtained by Fourier transformation of FIG. 19A. FIG. 19C illustrates one-dimensional MTF characteristics of the cross-section in the X direction passing the origin in FIG. 19B. Simulation is performed using the wavelength λ as 550 nm, and the spot shape of FIG. 19A is obtained by averaging results of nine points calculated by moving a filter position by 1500 nm in both X and Y directions to obtain an average of light reached to each pixel. FIG. 19C illustrates Nyquist frequency using the pixel pitch Ps as 6.4 μm and strong optical low-pass effect is superimposed on the Nyquist frequency. This more strongly controls color moire in the diagonal direction and luminance moire by folding of the MTF shape. FIG. 19D illustrates shapes obtained by projecting an autocorrelation function of the two-dimensional space of the structure in the one-dimensional direction. A straight line 1901 is an envelope curve that is expressed by the conditional expression (5) and follows when the structure is a complete regular shape, and a straight line 1902 is a straight line expressed by the conditional expression (9). Since the second highest intensity peak falls below the conditional expression (9), the conditional expression (5) is satisfied.

From the above, using the optical low-pass filter according to this example can perform photographing capable of strongly suppressing color moire and luminance moire.

Fourth Example

Figure 20A:
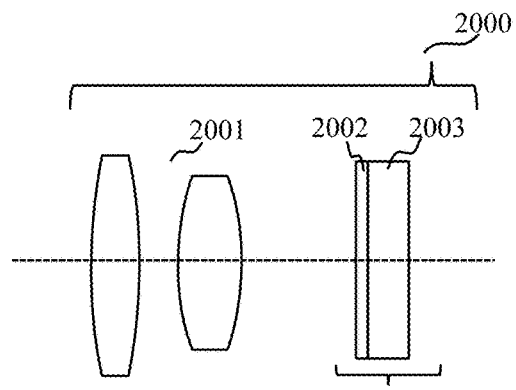
FIGS. 20A and 20B are configuration diagrams of an image pickup apparatus in which an optical low-pass filter is arranged.
Figure 20B:
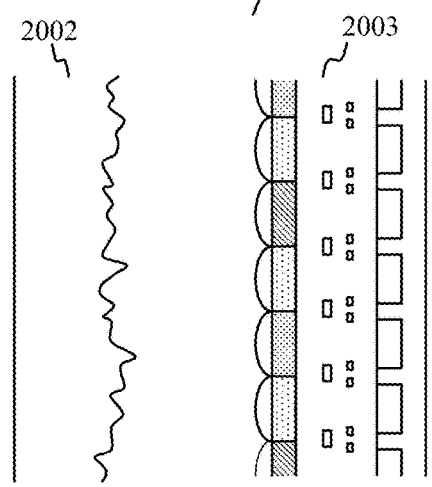

Applying the optical low-pass filter according to the present invention to an optical apparatus as an image pickup apparatus will be explained. FIGS. 20A and 20B illustrate schematic block diagrams one example of an image pickup apparatus 2000. The image pickup apparatus 2000 includes an image pickup optical system 2001, an optical low-pass filter 2002 and an image sensor 2003. As illustrated in FIG. 20B, the optical low-pass filter 2002 is arranged to come close to the image sensor 2003. The optical low-pass filter 2002 is applied to the optical low-pass filter according to first example or second example. This can perform photographing superimposing the optical low-pass effect capable of controlling dependence on the F-number and maintaining high resolution sensitivity in the horizontal direction while suppressing color moire in the diagonal direction.

First Comparison Example

Figure 21:
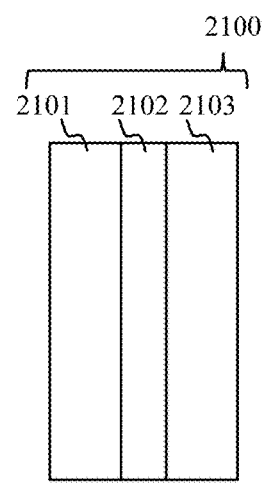
FIG. 21 is a configuration diagram of an optical low-pass filter according to a first comparison example.

An optical low-pass filter 2100 according to first comparison example will be explained referring to FIG. 21. The optical low-pass filter 2100 is applied to common digital single-lens reflex cameras and is four-point separation. ¼ wavelength plate 2102 is arranged between birefringence optical elements 2101 and 2103. MTF characteristics of the optical low-pass filter 2100 are illustrated in FIG. 10.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-097860, filed on May 13, 2015, which is hereby incorporated by reference herein in its entirety.

TABLE 1

| $\Delta z$ (μm) | Pf (nm) | <Pf> (nm) | Ps (nm) | nf | ng | d (nm) | Conditional expression (2) | Conditional expression (3)(nm) |
|---|---|---|---|---|---|---|---|---|
| 10 | 3200 | 4000 | 6400 | 1.5 | 1.0 | 2400 | 1.60 | 1200 |

TABLE 2

| $\Delta z$ (μm) | Pf (nm) | <Pf> (nm) | Ps (nm) | nf | ng | d (nm) | Conditional expression (2) | Condtional expression (3)(nm) |
|---|---|---|---|---|---|---|---|---|
| 10 | 2800 | 3400 | 6400 | 1.0 | 1.5 | 2400 | 1.25 | 1200 |

TABLE 3

| $\Delta z$ (μm) | Pf (nm) | <Pf> (nm) | Ps (nm) | nf | ng | d (nm) | Conditional expression (2) | Conditional expression (3)(nm) |
|---|---|---|---|---|---|---|---|---|
| 15 | 2400 | 3000 | 6400 | 1.5 | 1.0 | 2400 | 2.67 | 1200 |

What is claimed is:

1. An optical low-pass filter that is arranged on an object side of an image sensor in an image pickup apparatus and has an unevenness shape having a two-dimensional random structure with no specific periodicity in any direction, wherein the following conditions are satisfied:

$5.0\ \mu m \leq \Delta z \leq 80.0\ \mu m$;

$1.25 \leq Ps/<Pf> \leq 20.0$; and $0.05 \leq I1/I0 \leq 1-2.5(\Delta r/(2 \times 4 \cdot Ps))$, where $\Delta z$ represents a distance between the optical low-pass filter and the image sensor, Ps represents a pixel pitch of the image sensor, <Pf> represents an average pitch of the unevenness shape, I0 represents a highest peak intensity of autocorrelation of a shape height from a design surface of the optical low-pass filter in an arbitrary square region of $4 \cdot Ps \times 4 \cdot Ps$ in a surface on which the unevenness shape is formed, I1 represents a second highest peak intensity, and $\Delta r$ represents a distance from an origin of a second highest peak.

2. The optical low-pass filter according to claim 1, wherein the following condition is satisfied:

$200\ nm \leq |(n1-n2) \cdot d| 8000\ nm$, where n1 represents a refractive index of the optical low-pass filter, n2 represents a refractive index of a medium between the optical low-pass filter and the image sensor, and d represents a difference value between a maximum shape height and a minimum shape height of shape heights from a design surface of the optical low-pass filter in the unevenness shape.

3. An image pickup apparatus comprising:
an image sensor; and
an optical low-pass filter that is arranged on an object side of the image sensor and has an unevenness shape having a two-dimensional random structure with no specific periodicity in any direction, wherein the following conditions are satisfied:

$5.0\ \mu m \leq \Delta z \leq 80.0\ \mu m$;

$1.25 \leq Ps/<Pf> \leq 20.0$; and $0.05 \leq I1/I0 \leq 1-2.5(\Delta r/(2 \times 4 \cdot Ps))$, where $\Delta z$ represents a distance between the optical low-pass filter and the image sensor, Ps represents a pixel pitch of the image sensor, <Pf> represents an average pitch of the unevenness shape, I0 represents a highest peak intensity of autocorrelation of a shape height from a design surface of the optical low-pass filter in an arbitrary square region of $4 \cdot Ps \times 4 \cdot Ps$ in a surface on which the unevenness shape is formed, I1 represents a second highest peak intensity, and $\Delta r$ represents a distance from an origin of a second highest peak.

* * * * *